United States Patent
Park et al.

Patent Number: 6,035,003
Date of Patent: Mar. 7, 2000

[54] APPARATUS FOR CORRECTING FREQUENCY OFFSET IN OFDM RECEIVING SYSTEM

[75] Inventors: Young-Rok Park, Incheon, Rep. of Korea; Olivier Dejonghe, Metz, France

[73] Assignee: Daewoo Electronics Co., Ltd., Seoul, Rep. of Korea

[21] Appl. No.: 08/982,303

[22] Filed: Dec. 1, 1997

[30] Foreign Application Priority Data

Nov. 29, 1996 [KR] Rep. of Korea ............... 96-60088

[51] Int. Cl.$^7$ ............................................. H04L 27/14
[52] U.S. Cl. ............................................. 375/326; 370/208
[58] Field of Search ............... 375/316, 343, 375/345, 326, 371; 370/203, 208, 210, 516

[56] References Cited

U.S. PATENT DOCUMENTS

| | | | |
|---|---|---|---|
| 5,440,587 | 8/1995 | Ishikawa et al. | 375/332 |
| 5,579,346 | 11/1996 | Kanzaki | 375/344 |
| 5,602,835 | 2/1997 | Seki et al. | 370/206 |
| 5,694,389 | 12/1997 | Seki et al. | 370/208 |
| 5,774,450 | 6/1998 | Harada et al. | 370/206 |
| 5,812,523 | 9/1998 | Isaksson et al. | 370/208 |
| 5,889,759 | 3/1999 | McGibney | 370/207 |

FOREIGN PATENT DOCUMENTS

653 858 A3  5/1995  European Pat. Off. .
683 576 A1  11/1995  European Pat. Off. .

*Primary Examiner*—Chi H. Pham
*Assistant Examiner*—Emmanuel Bayard
*Attorney, Agent, or Firm*—Pillsbury Madison & Sutro LLP

[57] ABSTRACT

The disclosure describes an apparatus for correcting a frequency offset in a OFDM receiving system. The apparatus comprises a loop filter for receiving a predetermined phase value, multiplying the phase value by a gain value, accumulating the multiplied values, and outputting the accumulated value; a voltage control oscillator for multiplying the accumulated value outputted from the loop filter by the gain value, feeding back the result, and adding the feedback values; a derotator for obtaining sine and cosine waves from the result outputted from the voltage control oscillator, multiplying the obtained value by an output signal from an A/D converter, and outputting the multiplied value to an OFDM demodulator; a correlation calculation unit for calculating a correlation value from a value outputted from the OFDM demodulator; and a frequency offset estimator for generating a phase signal according to a frequency offset outputted sequentially within a predetermined frequency offset range, outputting the phase signal to the loop filter, determining an approximate value of the frequency offset within ¼ range of a carrier frequency interval by using a value outputted from the correlation calculating unit for a corrected symbol, and correcting the frequency offset according to a final determined frequency offset estimation value.

5 Claims, 4 Drawing Sheets

APPARATUS FOR CORRECTING FREQUENCY OFFSET IN OFDM RECEIVING SYSTEM

BACKGROUND OF THE INVENTION

1. Field of the Invention

The present invention relates to an orthogonal frequency division multiplexing (OFDM) receiving system, and more particularly to an apparatus for correcting a frequency offset caused by a difference between transmitted and received frequencies in OFDM receiving system within ¼ range of carrier frequency interval.

2. Description of the Prior Art

In a conventional wireless communication channel and digital high definition television (HDTV) transmission channel, an Inter-Symbol Interference (ISI) is generated by an occurrence of multi-path fading in a received signal. Particularly, when high speed data for HDTV are transmitted through the channel, the ISI increases causing errors to be generated during the recovery of the high speed data at receiving end. To solve this problem, recently, OFDM technique has been implemented to take an appropriate measure to counter against the multi-path fading problem in the Digital Audio Broadcasting (DAB) and HDTV standards. OFDM technique converts serially-inputted symbol streams with N number of symbols, multiplexes the N number of parallel symbols into different subcarrier frequencies, adds all the mutiplexed data, and transmits the added data. Here, the N number of parallel data are defined as one unit block, and each subcarrier of the unit block has an orthogonal characteristic, which does not have an influence on inter-subcarrier channels. Compared to a conventional carrier transmission method, OFDM method can decrease the occurrence of ISI caused by the multi-path fading while maintaining the same symbol transmission rate and increasing symbol period as much as by the number of subcarrier channels (N). Especially, OFDM method utilizes an insertion of guard interval (GI) between the transmitted symbols for an ISI reduction, making it possible to realize a simplified structure of channel equalizer desired. In contrast to a conventional Frequency Division Multiplexing (FDM) type, OFDM method has a characteristic that spectrums of each subcarrier channel are superimposed enabling it to have a higher spectrum efficiency. Further, the spectrum has a waveform of a rectangular shape and an electric power is uniformly distributed at each frequency band, which prevents from being affected by the same co-channel interference signal.

Meanwhile, an abrupt variation of a channel characteristic makes the frequency band of transmitting signal susceptible to the Doppler Effect, or an unstable state of a tuner causes non-synchronization between transmitting and receiving frequencies resulting in frequency offset. The frequency offset decreases the decoding capability of the receiving system by varying the phase of receiving signal. In an OFDM method using multi-carrier, a symbol according to each sub-channel is detected. In presence of frequency offset, an orthogonal characteristic between each subcarrier frequency is not maintained causing an interference between two adjacent sub-channels. Particularly, each subcarrier is closely distributed within a band as the number of OFDM sub-channel increases, such that the interference between adjacent sub-channels is generated even at a small frequency offset value. Hence, the frequency offset correction is one of the most important things to consider when designing and constructing an OFDM receiving system.

Concerning this frequency offset correction, in 1995, F. Daffara and O. Adami proposed a frequency offset correction circuit using a guard interval comprised in an OFDM signal in "A new frequency detector for orthogonal multicarrier transmission technique" disclosed in Prc. of VTC'95. In this prior art, a characteristic curve related to the frequency offset obtained in respect to the guard intervals and circular prefix characteristic of the transmitting signal, is utilized to construct a frequency offset correction circuit using phase locked loop (PLL).

The circuit has merits of a simple structure, but it has a drawback in that as the frequency offset value increases, its correcting ability decreases. More, the circuit can not be applied when the frequency offset value is larger than the frequency interval between subcarriers.

In 1994, P. H. Moose proposed a frequency offset correction circuit without using PLL, which efficiently adapts to channel environment by estimating a frequency offset value through transmitting a special symbol stream in frequency selective fading channel, in "A technique for orthogonal frequency division multiplexing frequency offset correction" IEEE Trans. Commun., vol. COM-42, published on October, 1994.

However, in this method, the transmitting speed of useful symbols decreases as the symbol stream is transmitted repeatedly, and its application is limited when the frequency offset ($\epsilon$) is larger than the frequency interval between the adjacent subcarriers.

That is, when the frequency offset ($\epsilon$) is $|\epsilon|>0.5$, the offset correcting capability of the receiving end decreases since the frequency offset causes a circular shift between decoded OFDM symbols by deflection-shifting frequencies of each subcarrier to an adjacent sub-channel bandwidth. Here, only the circular shift is generated if the frequency offset value is an integer, whereas both a cross talk, an adjacent channel interference, and the circular shift is generated if the frequency offset value is not an integer since the received signal is defined as a discrete signal in Fourier operation.

When the frequency offset ($\epsilon$) is $|\epsilon|<0.5$, only the cross talk is generated without the circular shift. When the frequency offset is an integer ($\epsilon=m$, where m is an integer), although the interference between a corresponding channel and its adjacent channel is not generated, an l-th symbol is transmitted to the (l-m)-th sub-channel. Therefore, in a system utilizing a general correction method used for the frequency offset, an accurate recovery of transmitted signal is limited.

Accordingly, for an accurate frequency offset correction, at first, a process for reducing the frequency offset value within the range which does not generated a circular shift ($|\epsilon|<½$) is performed, and next, a frequency offset detection process for accurately detecting the frequency offset is performed.

For the above described method, in 1994, F. Classen and H. Myer proposed a frequency offset estimation method using two steps, an acquisition process for reducing initial frequency offset within a constant range and a tracking process for tracking accurately the frequency offset before estimating the frequency offset value, in "Frequency synchronization algorithm for OFDM systems suitable for communication over frequency selective fading channels" published in Proc. Of VTC'94 in 1994.

However, this method has a problem in that the amount of calculation for the acquisition process is large and the frequency offset does not decrease according to the channel characteristics.

That is, although the frequency offset value is decreased within ½ range of carrier frequency the amount of calculation for the tracking process increases if the frequency offset value is near the boundary of ½ range of carrier frequency interval.

SUMMARY OF THE INVENTION

In view of the foregoing, it is an object of the present invention to provide an apparatus for correcting a frequency offset caused by a difference between transmitted and received frequencies in OFDM receiving system within ¼ range of carrier frequency interval.

In order to achieve the above object, the present invention provides an apparatus for correcting a frequency offset in OFDM receiving system comprising: a loop filter for receiving a predetermined phase value, multiplying the phase value by a gain value, accumulating the multiplied values, and outputting the accumulated value; a voltage control oscillator for multiplying the accumulated value outputted from the loop filter by the gain value, feeding back the result, and adding the feedback values; a derotator for obtaining sine and cosine waves from the result outputted from the voltage control oscillator, multiplying the obtained value by an output signal from an A/D converter, and outputting the multiplied value to an OFDM demodulator; a correlation calculation unit for calculating a correlation value from a value outputted from the OFDM demodulator; and a frequency offset estimator for generating a phase signal according to a frequency offset outputted sequentially within a predetermined frequency offset range, outputting the phase signal to the loop filter, determining an approximate value of the frequency offset within ¼ range of a carrier frequency interval by using a value outputted from the correlation calculating unit for a corrected symbol, and correcting the frequency offset according to a final determined frequency offset estimation value.

BRIEF DESCRIPTION OF THE DRAWINGS

The above and other objects, features, and advantages of the present invention will be apparent from the following detailed description of the preferred embodiments of the invention in conjunction with the accompanying drawings, in which.

DESCRIPTION OF THE PREFERRED EMBODIMENT

Reference will now be made in detail to the present invention, examples of which are illustrated in the accompanying drawings. Wherever possible, the same reference numbers will be used throughout the drawings to refer to the same or like parts.

Figure 1:
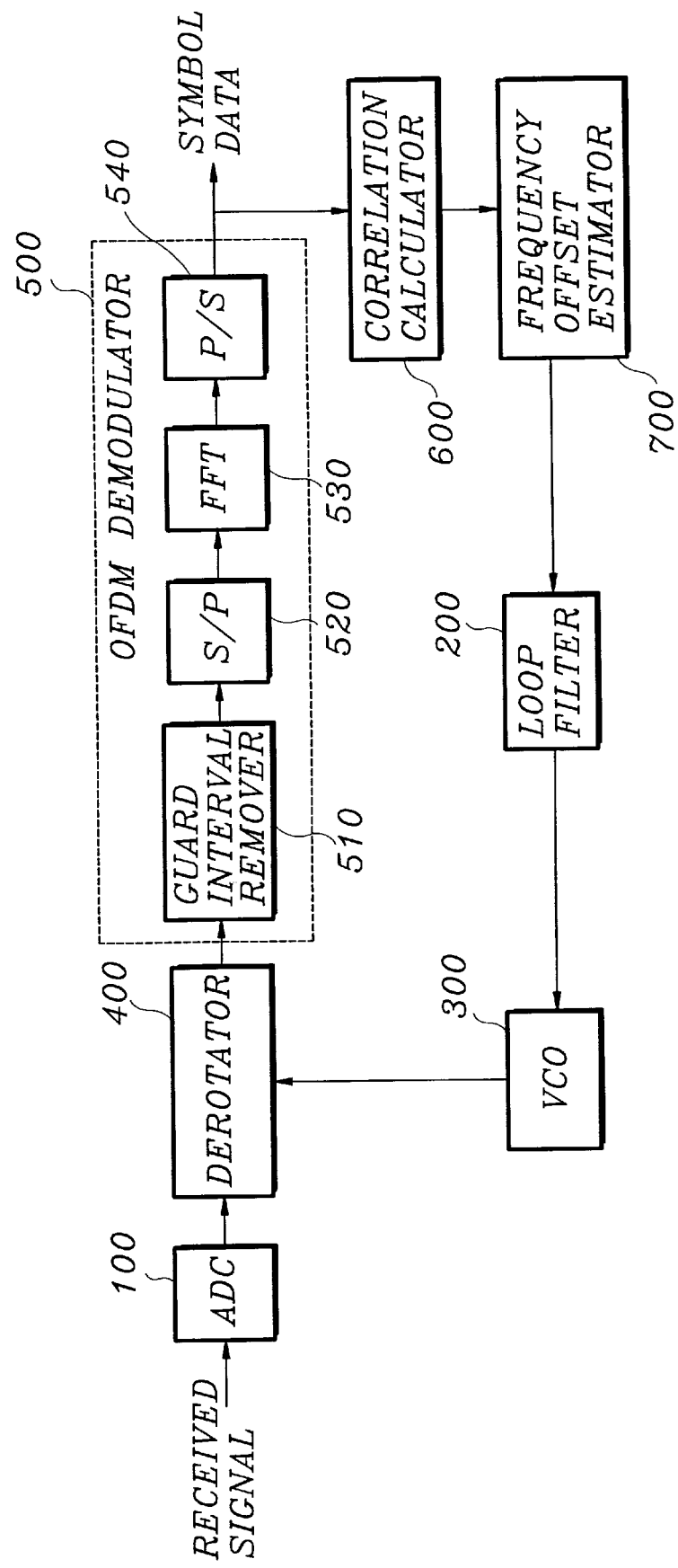
FIG. 1 is a block diagram illustrating an apparatus for correcting a frequency offset in an OFDM receiving system according to the present invention.

FIG. 1 shows a perspective block diagram of an OFDM receiving system in accordance with a preferred embodiment of the present invention. The OFDM receiving system comprises an analog-to-digital converter (ADC) 100, a loop filter 200, a voltage controlled oscillator (VCO) 300, a derotator 400, an OFDM demodulator 500, a correlation calculator 600, and a frequency offset estimator 700.

The ADC 100 converts a received channel signal to a digital signal. The loop filter 200 receives a phase signal value according to an arbitrary frequency offset inputted from the frequency offset estimator 700, multiplies this phase signal value by a gain value, and accumulates and outputs the multiplied value to the VCO 300. The VCO 300 multiplies the signal outputted from the loop filter 200 by a gain value, feeds back the multiplied value, adds the signal to the feedback value, and outputs the added value to the derotator 400.

The derotator 400 obtains sine and cosine components from the value outputted from the VCO 300, multiplies the sine and cosine components by a digital signal transferred from the ADC 100, and outputs the multiplied value to the OFDM demodulator 500.

The OFDM demodulator 400 comprises a guard interval remover 510, a serial/parallel converter 520, a fast fourier transform (FFT) circuit 530, and a parallel/serial converter 540. The guard interval remover 510 receives the value outputted from the derotator 400, extracts only the symbols within the useful symbol interval, and supplies the extracted signal to the serial/parallel converter 520. The serial/parallel converter 520 inverts serial data to parallel data for all subcarriers, and outputs the parallel data to the FFT circuit 530. The FFT circuit 530 demodulates subcarriers by a FFT operation. The parallel/serial converter 540 converts the data outputted from the FFT circuit 530 to serial data, and outputs them.

The correlation calculator 600 receives a value outputted from the OFDM demodulator 500, and calculates a correlation in symbol units.

In an embodiment of the present invention, the correlation is calculated by using a continual pilot carrier (CPC) comprised in a predetermined place within symbols outputted from the OFDM demodulator 500.

In European terrestrial broadcasting system, some information within various cells of an OFDM frame to be transmitted are already demodulated at the receiver as a reference information. The cells comprising the reference information are transmitted in boosted power level of a stronger energy signal, in which the amplitude is 1/0.75 times of other cells. The information values of the cells are derived from a Pseudo Random Binary Sequence (PRBS) having a series of value for each transmitted carrier.

Here, in European Transmission Standards, as shown in the following table 1., the CPC is transmitted at the predetermined place within a symbol.

TABLE 1

Continual Pilot Carrier Location

| 2K mode | 8K mode |
| --- | --- |
| 0 48 54 87 141 156 192 201 255 279 282 | 0 48 54 87 141 156 192 201 255 279 282 |
| 333 432 450 483 525 531 618 636 714 759 | 333 432 450 483 525 531 618 636 714 |
| 765 780 804 873 888 918 939 942 969 984 | 759 765 780 804 873 888 918 939 942 969 |
| 1050 1101 1107 1110 1137 1140 1146 | 984 1050 1101 1107 1110 1137 1140 1146 |
| 1206 1269 1323 1377 1491 1683 1704 | 1206 1269 1323 1377 1491 1683 1704 |
| | 1752 1758 1791 1845 1860 1896 1905 |
| | 1959 1983 1986 2037 2136 2154 2187 |
| | 2229 2235 2322 2340 2418 2463 2469 |
| | 2484 2508 2577 2592 2622 2643 2646 |
| | 2673 2688 2754 2805 2811 2814 2841 |
| | 2844 2850 2910 2973 3027 3081 3195 |
| | 3387 3408 3456 3462 3495 3549 3564 |
| | 3600 3609 3663 3687 3690 3741 3840 |
| | 3858 3891 3933 3939 4026 4044 4122 |
| | 4167 4173 4188 4212 4281 4296 4326 |
| | 4347 4350 4377 4392 4458 4509 4515 |
| | 4518 4545 4548 4554 4614 4677 4731 |
| | 4785 4899 5091 5112 5160 5166 5199 |
| | 5253 5268 5304 5313 5367 5391 5394 |
| | 5445 5544 5562 5595 5637 5643 5730 |
| | 5748 5826 5871 5877 5892 5916 5985 |
| | 6000 6030 6051 6054 6081 6096 6162 |
| | 6213 6219 6222 6249 6252 6258 6318 |
| | 6381 6435 6489 6603 6795 6816 |

As the amplitude (C) of the CPCs has an energy of 1/0.75 times of a traditional transmission signal (C'), the reference signal value has a higher energy than a data carrier. Multiplying the reference signal values to each other and adding the multiplied values to each other generates a correlation value, which becomes a maximum value when the frequency offset is a minimum value.

Accordingly, in the embodiment of the present invention, as described above, a correlation is obtained by using the CPC in a symbol, and the frequency offset value is obtained by utilizing the correlation.

Figure 2:
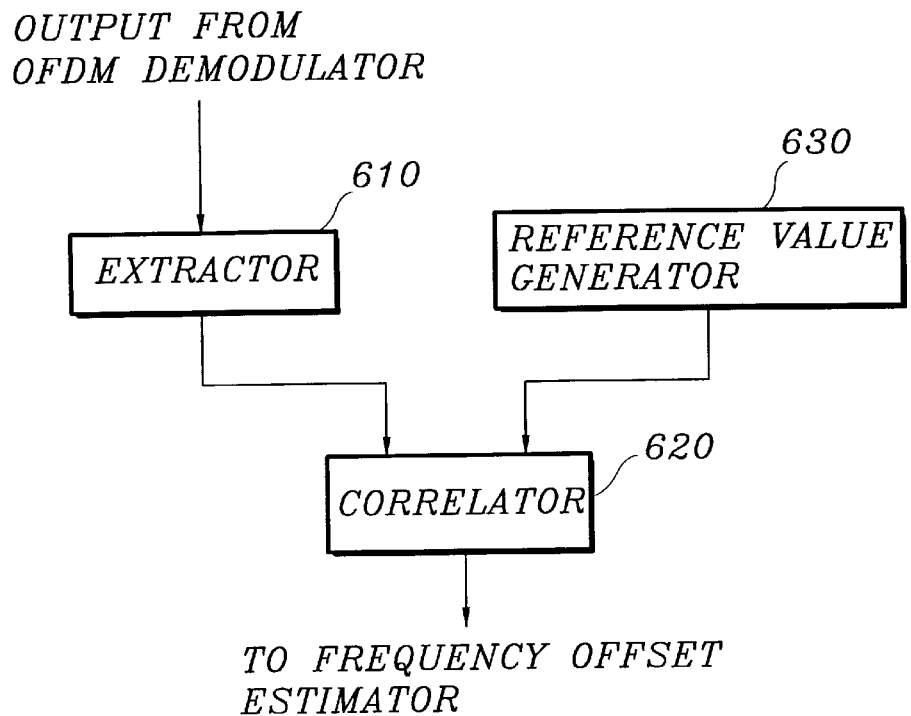
FIG. 2 is a detailed block diagram illustrating a correlation calculator of FIG. 1.

FIG. 2 shows a structural block diagram of the correlation calculator 600 illustrated in FIG. 1. The correlation calculator 600 comprises an extractor 610, a correlator 620, and a reference value generator 630.

The extractor 610 extracts and outputs only the CPCs in a predetermined place of series of symbols outputted from the OFDM demodulator 500. The correlator 620 calculates a correlation by using the CPC outputted from the extractor 610 and the reference value corresponding to the CPC, to calculate accumulatively the correlation within a symbol.

At this time, the reference value generator 630 for providing the reference value to the correlator 620 can be constructed by a PRBS used for generating the reference value contained in symbol at the transmitting end.

Figure 3:
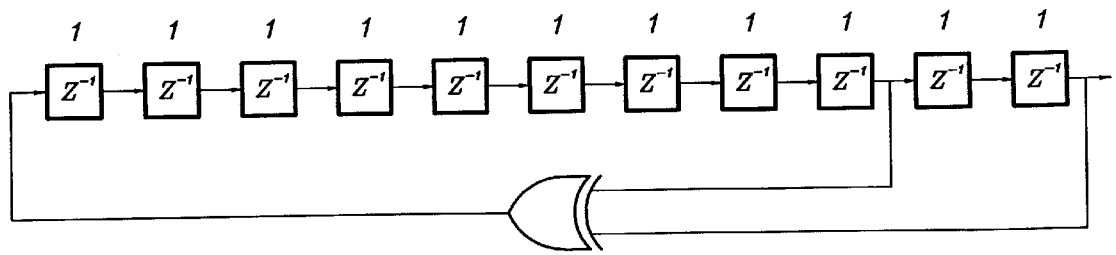
FIG. 3 is a diagram illustrating a PRBS for generating a reference value.

The PRBS, as shown in FIG. 3, is initialized when a first output bit from a PRBS corresponds to a first active carrier. New values are generated in each carrier from the PRBS. A polynomial of the PRBS is represented by the following.

$$G(X)=X^{11}+X^{2}+1$$

In the pilot cell, a real portion is 1 and an imaginary portion is 0 when the PRBS generates "0", whereas the real portion is −1 and the imaginary portion is 0 when the PRBS generates "1".

The frequency offset estimator 700 predetermines an arbitrary frequency offset deviation range, generates a phase signal according to a sequentially-generated frequency offset, outputs the phase signal to the loop filter 200, and determines an approximate value of the frequency offset according to the correlation outputted from the correlation calculator 600.

Figure 4:
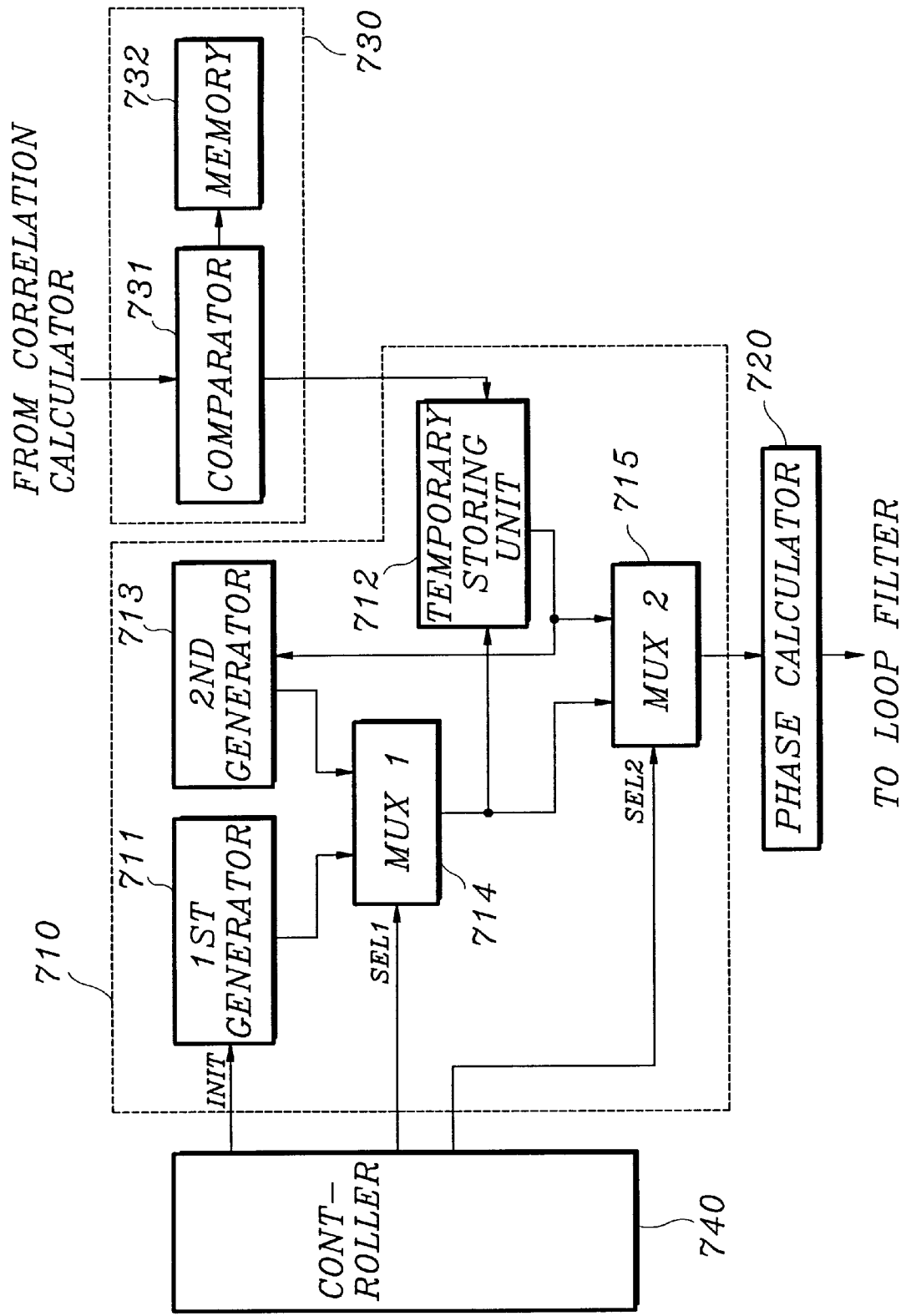
FIG. 4 is a detailed block diagram illustrating a frequency offset estimator of FIG. 1.

FIG. 4 shows a structural block diagram of the frequency offset estimator 700 according to the present invention. The frequency offset estimator 700 comprises a frequency offset value generator 710, a phase calculator 720, a comparing unit 730, and a controller 740.

The frequency offset value generator 710 generates sequentially an integer or a decimal fraction in a predetermined range, and outputs it to the phase calculator 720. The phase calculator 720 multiplies the value outputted from the frequency offset value generator 710 by the frequency value corresponding to the carrier frequency interval, to obtain a phase signal. The phase signal outputted from the phase calculator 720 is outputted to the loop filter 200 to correct the frequency of the received signal. Data in which the frequency is corrected is modulated by the OFDM-demodulator 500, and correlation values corresponding to the OFDM-demodulated data are calculated in the correlation calculator 600 to output them the comparing unit 730. The comparing unit 730 compares sequentially the correlation values outputted from the correlation calculator 600, stores large correlation values, and controls the storing of the value outputted from the frequency offset value generator 710 for generating the stored correlation values as a frequency offset value. The controller 740 initializes the frequency offset value generator 710, the comparing unit 730 and the loop filter 200, estimates the finally-obtained frequency offset estimation value as an offset value of the received frequency, for correcting the frequency of a current channel.

The frequency offset value generator 710 comprises a first generator 711, a temporary storing unit 712, a second generator 713, a first multiplexer 714, and a second multiplexer 715.

The first generator 711 generates an integer in a predetermined range, outputs it to the phase calculator 720 to be converted into a phase signal corresponding thereto. The received signal is corrected in the derotator 400 by the converted phase signal, and the corrected signal is outputted to the OFDM demodulator 500. The correlation calculator 600 calculates and outputs the correlation of the corresponding symbol. The comparing unit 730 compares the correlation to the stored correlation. At this time, the comparing unit 730 controls the update of the temporary storing unit 712 according to the compared result.

When the correlation value is larger than the stored correlation, the value outputted from the first generator 711 is stored in the temporary storing unit 712. When the correlation value is smaller than the stored correlation, the value stored in the temporary storing unit 712 is maintained without updating.

The first generator 711 sequentially generates integers in the predetermined range, and the generated integers are stored in the temporary storing unit 712. The stored values correspond to approximate values of the frequency offset values having values within ½ range of the carrier frequency interval.

Figure 5:
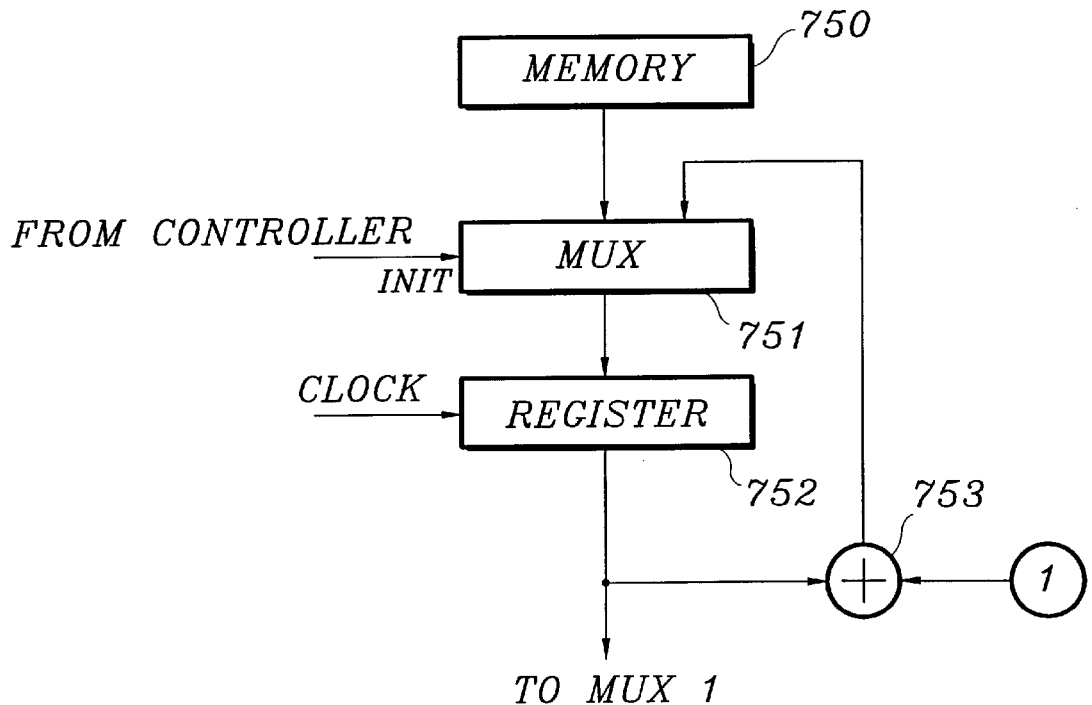
FIG. 5 is a diagram illustrating a preferred embodiment of a first generator illustrated in FIG. 4.

FIG. 5 shows the first generator 711 in accordance with an embodiment of the present invention. The first generator 711 comprises a memory 750, a multiplexer 751, a register 752, and an adder 753.

The memory 750 generates a predetermined initial value. The multiplexer 751 receives the initial value from the memory 750 and the feedback value, selects and outputs the initial value according to the initial signal from the controller 740, and next, selects and outputs the feedback value. The register 752 stores the value outputted from the multiplexer 751, and outputs the stored value according to a clock signal. The signal outputted from the register 752 is added to "1" in the adder 753, and the added signal is fed back to the multiplexer 751.

The second generator 713 reads the values finally stored from the first generator 711 to the temporary storing unit 712, and generates sequentially values within ±0.5 range of them.

Figure 6:
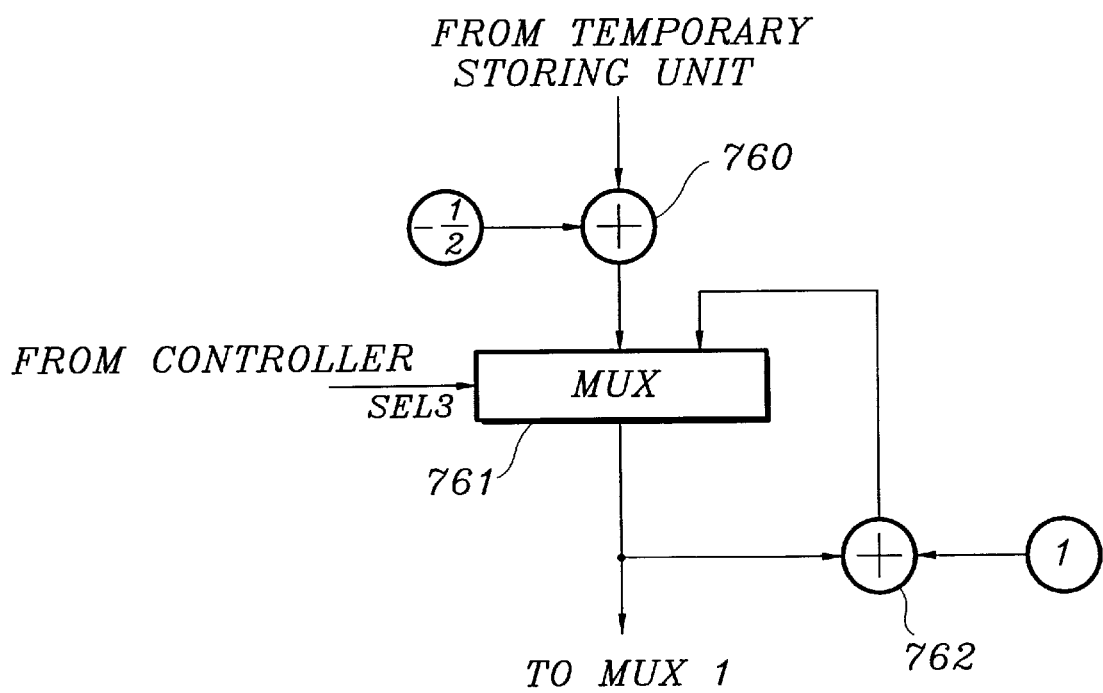
FIG. 6 is a diagram illustrating a preferred embodiment of a second generator illustrated in FIG. 4.

FIG. 6 shows the second generator 713 according to an embodiment of the present invention. The second generator 713 comprises a first adder 760, a multiplexer 761, and a second adder 762.

The first adder 760 adds the value read from the temporary storing unit 712 to "−0.5", and outputs the added value. The multiplexer 761 selects and outputs the value outputted from the first adder 760 and the value outputted from the second adder 762 according to a selection signal sel3 from the controller 740. The adder 762 adds the value outputted from the multiplexer 761 to "1", and feeds back the added value to multiplexer 761.

The first multiplexer 714 selects and outputs the values outputted from the first and second generators 711 and 713 according to a selection signal sel1 from the controller 740.

The second multiplexer 715 selects and outputs the values outputted from the first multiplexer 714 and the temporary storing unit 712 according to a selection signal sel2 from the controller 740.

The comparing unit 730 comprises a comparator 731 and a memory 732. The comparator 731 receives the correlation values of symbol units outputted from the correlation calculator 600, sequentially compares them, stores the larger values to the memory 732, and controls the storing of the output value of the frequency offset value generator 710 for generating the correlation values stored in the memory 732 to the temporary storing unit 712.

The phase calculator 720 multiplies the output value from the frequency offset value generator 710 by the carrier frequency interval, and outputs the multiplied value to the loop filter 200.

The controller 740 initializes the frequency offset value generator 710, the comparator 731, and the loop filter 200, and in the final step, selects the value stored in the temporary storing unit 712 as the frequency offset value, and outputs the selectant to the phase calculator 720.

Hereinafter, another embodiment of the present invention applied to an OFDM frame coded/encoded with 2K mode in European Telecommunication Standard will be described in detail.

Here, the OFDM frame has $T_f$ period and 68 OFDM symbols. One super frame comprises 4 frames. Each symbol has K=1705 carriers, and is transmitted in Ts period. Further, each symbol comprises useful data transmitted in $T_u$ period and guard intervals transmitted in $\Delta$ period. Here, assume that the guard interval is ¼ of the useful data. Parameters of the OFDM are as follows.

| Parameter | 2K mode |
|---|---|
| Number of carriers K | 1705 |
| Value of carrier number $K_{min}$ | 0 |
| Value of carrier number $K_{max}$ | 1704 |
| Duration $T_u$ | 224 μs |
| Carrier spacing $1/T_u$ | 4464 Hz |
| Spacing between carriers $K_{min}$ and $K_{max}$ (K−1)/$T_u$ | 7.61 MHz |

The first generator 711 according to the second embodiment of the present invention sequentially generates integers −S, −S+1, . . . , 0, . . . , S−1, S. Here, assume S=27.

During the system initialization, the memory 732, the temporary storing unit 712, and the first generator 711 are initialized, and the stored values become 0.

When the first generator 711 is initialized and generates −27, the first and second multiplexers 714 and 715 select the value outputted from the first generator 711, and output the selectant to the phase calculator 720. The phase calculator 720 then multiplies −27 with the carrier interval, 4464 Hz, and outputs the multiplied value. By the phase signal value, the frequency of the received signal inputted from a derotator 400 to the ADC 100 is corrected.

The corrected signal is outputted to the OFDM demodulator 500 for demodulation. At this time, the extractor 610 extracts the CPC from the demodulated symbol from the OFDM demodulator 500. The CPC outputted from the extractor 610 is interpolated with the predetermined value of the correlator 620 inputted to the reference value generator 630, to calculate the correlation. The obtained correlation value of the symbol from the correlation calculator 600 is outputted to the comparing unit 730, and stored in the memory 732 since it is larger than the initial value "0". The comparing unit 730 controls the storing of the value, −27, outputted from the first generator 711 to the temporary storing unit 712.

Next, the first generator 711 outputs −26 to the phase calculator 720 to be converted into the phase signal corresponding to the frequency offset value −26 and outputs the phase signal to the loop filter 200. The value outputted from the loop filter 200 is outputted the VCO 300 through the derotator 400. The derotator 400 separates the inputted signal into the sine and cosine components, corrects the frequency offset by multiplying them by the frequency of the output value from the ADC 100, and outputs the corrected value to the OFDM demodulator 500.

The extractor 610 extracts the CPC from the symbol demodulated in the OFDM demodulator 500. The correlation calculator 600 calculates the correlation of the extracted CPC and the output value from the reference value generator 630. The correlation value of the symbol outputted from the correlation calculator 600 is compared to the correlation value −27 corresponding stored in the comparing unit 730, and the larger value of the compared values is stored in the temporary storing unit 712. Through the above process, the first generator 711 sequentially generates −27 to 27, and the temporary storing unit 712 stores the integer having the maximum correlation value. The predetermined value from the first generator 711, for example L when L is the maximum correlation value, is stored in the temporary storing unit 712.

At this time, the stored value L becomes the frequency offset estimation value in which the frequency offset is within ½ range of the carrier frequency interval.

The second generator 713 reads the final value obtained by the first generator 711 from the temporary storing unit 712, subtracts −0.5 from the read value, and outputs the subtracted value. The controller 740 controls the first and second multiplexers 714 and 715 to select the output value from the second generator 713 and output the selectant to phase calculator 720. The phase calculator 720 multiplies the output value from the second generator 713 by the carrier frequency interval, and outputs the multiplied value. The derotator 400 corrects the frequency of the channel signal. The OFDM demodulator 500 demodulates the corrected channel signal, and outputs the symbol. The correlation calculator 600 calculates the correlation from the symbol outputted from the OFDM demodulator 500, and outputs the correlation to the comparing unit 730. The comparing unit 730 then compares the stored correlation value with the inputted correlation value, updates the stored value if the inputted correlation value is larger than the stored value, and controls the temporary storing unit 712 to update the input value of the second generator 713.

The second generator 713 adds the previous output value to +1, and outputs the added value. The added value is converted to the phase signal in the phase calculator 720, and the phase signal is outputted to the loop filter 200. By the phase signal, the frequency of the channel signal inputted from the ADC 100 is corrected. The channel signal having the corrected frequency is modulated in the OFDM demodulator 500, to output the symbol signal.

As described above, the final stored value in the temporary storing unit 712 is determined as the frequency offset estimation value of the received channel signal.

The above determined frequency offset estimation value becomes the value estimated within ¼ range of the carrier frequency interval.

Accordingly, the controller 740 controls the second multiplexer 715 to output the stored value to the phase calculator 720. The phase calculator 720 receives the output value from the second multiplexer 715 to calculate the phase signal, and outputs the calculated phase signal to the loop filter 200. The output value from the loop filter 200 is outputted the voltage controlled oscillator 300 through the derotator 400. The derotator 400 corrects the frequency of the channel signal inputted from the ADC 100 in which the frequency offset is bound within ¼ range of the carrier frequency interval.

As described above, a faster frequency synchronization than non-corrected frequency offset can be realized by synchronizing the corrected signal.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. An apparatus for correcting a frequency offset of a received OFDM signal and providing the corrected OFDM signal to an OFDM demodulator through a PLL circuit formed by said apparatus, a loop filter, a voltage controlled oscillator and a derotator in OFDM receiving system, said apparatus comprising:

correlation calculating means for calculating a correlation value from a predetermined reference signal and a value outputted from said OFDM demodulator; and frequency offset estimating means a frequency offset value generator for sequentially generating and outputting an integer or a decimal fraction in a predetermined range as a frequency offset value:

a comparator for controlling the storage of a larger value of the correlation values outputted from said correlation calculating means and the output value from said frequency offset value generator used for generating correlation values stored in said temporary storing unit;

a chase calculator for multiplying the output value from said frequency offset value generator by a carrier frequency interval to obtain a phase signal to be provided to said loop filter; and a controller for controlling the initializing of said frequency offset value generator, said temporary storing unit, said comparator, and said loop filter, the selecting of a value stored in said temporary storing unit as the frequency offset value, and the outputting of the selected value to said loop filter through said phase calculator.

2. The apparatus of claim 1, wherein said frequency offset value generator comprises:

a first generator for sequentially generating an integer in a predetermined range;

a second generator for sequentially generating values by adding or subtracting 0.5 to or from the integers stored in said temporary storing unit; and a selector for selecting and outputting the output values from said first and second generators.

3. The apparatus of claim 1, wherein said correlation calculating means calculates the correlation by using CPCs contained in a predetermined place of symbols outputted from the OFDM demodulator.

4. The apparatus of claim 3, wherein said correlation calculating means comprises:

an extractor for sequentially extracting only the CPCs in a predetermined place of symbols in series outputted from the OFDM demodulator;

a reference value generator for generating reference values of the CPCs generated from a transmitting end; and a correlator for calculating a correlation by using the CPCs outputted from said extractor and the output value from said reference value generator, and outputting the correlation value in symbol units by accumulating the calculated correlation values.

5. The apparatus of claim 4, wherein said reference value generator is constructed for processing PRBS.

* * * * *